United States Patent
Nakano et al.

(10) Patent No.: US 8,682,033 B2
(45) Date of Patent: Mar. 25, 2014

(54) BOUNDARY DETECTION DEVICE FOR VEHICLES

(75) Inventors: Hiroki Nakano, Kariya (JP); Katsuhiko Hibino, Anjo (JP)

(73) Assignee: Denso Corporation, Kariya (JP)

(*) Notice: Subject to any disclaimer, the term of this patent is extended or adjusted under 35 U.S.C. 154(b) by 270 days.

(21) Appl. No.: 13/347,825

(22) Filed: Jan. 11, 2012

(65) Prior Publication Data

US 2012/0177250 A1    Jul. 12, 2012

(30) Foreign Application Priority Data

Jan. 12, 2011  (JP) ................................ 2011-004121

(51) Int. Cl.
*G06K 9/00* (2006.01)

(52) U.S. Cl.
USPC .......................................................... 382/103

(58) Field of Classification Search
USPC ................................................ 382/100, 103
See application file for complete search history.

(56) References Cited

U.S. PATENT DOCUMENTS

| | | | |
|---|---|---|---|
| 2010/0098295 A1* | 4/2010 | Zhang et al. | 382/103 |
| 2012/0099766 A1* | 4/2012 | Klein et al. | 382/104 |

FOREIGN PATENT DOCUMENTS

| | | | | |
|---|---|---|---|---|
| EP | 0899582 | * | 3/1999 | ............. G01S 13/93 |
| JP | S63-142478 | | 6/1988 | |
| JP | 06-149359 | | 5/1994 | |
| JP | 3589293 | | 8/2004 | |

OTHER PUBLICATIONS

Office Action issued Dec. 21, 2012 in corresponding Japanese Application No. 2011-004121 with English translation.

* cited by examiner

*Primary Examiner* — Shefali Goradia
(74) *Attorney, Agent, or Firm* — Harness, Dickey & Pierce, PLC (57) ABSTRACT

In a lane boundary detection device, a plurality of edge components are extracted from a captured image capturing the periphery of the own vehicle. Candidates of a curve (including straight lines) that is to be the boundary of a driving area are extracted as boundary candidates based on the placement of the plurality of edge components. Then, an angle formed by a tangent in a predetermined section of each extracted boundary candidate and a vertical line in the captured image is calculated. Boundary candidates of which the formed angle is less than an angle reference value are set to have low probability. The boundary candidate having the highest probability among the boundary candidates is set as the boundary of the driving area.

18 Claims, 5 Drawing Sheets

—·—·— ANGLE REFERENCE VALUE OR GREATER
— — — — LESS THAN ANGLE REFERENCE VALUE

BOUNDARY DETECTION DEVICE FOR VEHICLES

CROSS-REFERENCE TO RELATED APPLICATION

This application is based on and claims the benefit of priority from earlier Japanese Patent Application No. 2011-4121 filed Jan. 12, 2011, the description of which is incorporated herein by reference.

BACKGROUND OF THE INVENTION

1. Field of the Invention

The present invention relates to a boundary detection device to be mounted in a vehicle and detects a boundary of a driving area in which the own vehicle is traveling, and a boundary detection program.

2. Description of the Related Art

As the above-described boundary detection device, a device is known that detects edge components (edge points) and detects a boundary (white line) of a driving lane from the detected edge components (refer to, for example, U.S. Pat. No. 3,589,293).

However, in the above-described boundary detection device, a peripheral object (such as a building or a utility pole) reflected on a road surface may be erroneously recognized as the boundary of the driving lane.

SUMMARY

Therefore, in light of such issues, it is desired to enable a boundary detection device to accurately detect a boundary of a driving lane even when a reflection is present on a road surface.

In a boundary detection device according to an exemplary embodiment configured to achieve the above-described object, an edge extracting means extracts a plurality of edge components from a captured image capturing the periphery of the own vehicle. A boundary candidate extracting means extracts candidates of a curve (including straight lines) that is to be the boundary of the driving area as boundary candidates based on placement of the plurality of edge components. A probability (or certainty) setting means calculates an angle formed by a tangent in a predetermined section of each extracted boundary candidate and a vertical line in the captured image. The probability setting means then sets a boundary candidate of which the formed angle is less than an angle reference value to have low probability. A boundary setting means sets a boundary candidate having the highest probability among the boundary candidates as the boundary of the driving area.

In other words, in the boundary detection device, in the captured image, a curve that is to be the boundary of the driving area often extends in a direction at an angle by a certain extent from the vertical direction, whereas a curve that is to be an object reflected on the road surface often extends in a direction almost matching the vertical direction. Focusing on this characteristic, a boundary candidate of which the angle formed by the curve serving as the boundary candidate and the vertical line in the captured image is less than the angle reference value is set to have a lower probability. The boundary candidate is thereby detected.

In a boundary detection device such as this, the curve that should be the boundary of the driving area has a relatively high probability and can be easily set as the boundary of the driving area. Therefore, even when a reflection is present on the road surface in the captured image, the boundary of the driving lane can be accurately detected.

In the embodiment, the edge component indicates an area in which change in luminance that is a luminance reference value or more occurs between adjacent pixels, among the numerous pixels configuring the captured image.

In the above-described boundary detection device, as according to another aspect, the probability setting means may eliminate, from the boundary candidates, a boundary candidate that is less than an elimination reference value in which the formed angle is set to a value that is the angle reference value or less. In other words, the probability setting means may set the probability to zero.

In a boundary detection device such as this, the boundary candidates that are less than the elimination reference value are determined to be reflected objects and are eliminated. Therefore, the accuracy of detection of the boundary of the driving lane can be improved. The angle reference value and the elimination reference value may be the same value or different values.

In the above-described boundary detection device, as according to a third embodiment, the boundary setting means may perform the Hough transform on each component configuring boundary candidates that have not been eliminated, thereby detecting new boundary candidates. The boundary setting means may then select a boundary candidate having the highest probability among the new boundary candidates.

In a boundary detection device such as this, the Hough transform is performed on each edge component configuring the boundary candidates that have not been eliminated and new boundary candidates are detected. Therefore, the boundary of the driving area can be detected using accurate boundary candidates. When the boundary candidate extracting means extracts the boundary candidates using the Hough transform, the Hough transform may be performed twice. In other words, the Hough transform may be performed by the boundary candidate extracting means and the boundary setting means.

In addition, in the above-described boundary detection device, as according to another aspect, an extraction prohibiting means may be included for prohibiting setting of the boundary of the driving area by the boundary setting means using the captured image, when the number or percentage of boundary candidates of which the formed angle is less than the angle reference value is an extraction judgment reference value set in advance or more. The percentage of the boundary candidates refers to the number of boundary candidates of which the formed angle is less than the angle reference value in relation to the total number of boundary candidates.

In a boundary detection device such as this, when the number or percentage of the boundary candidates of which the formed angle is less than the angle reference value is the extraction judgment reference value or more, or in other words, when numerous reflections are present in the captured image, the reliability of the captured image itself is considered low. Use of the captured image can be prohibited. In this instance, for example, the boundary of the driving lane may be detected by a method that does not use the captured image (such as a method using laser radar).

In the above-described boundary detection device, as according to another aspect, a low reliability flag setting means may be included for setting a flag indicating that reliability of the captured image is low in association with the captured image when the extraction prohibiting means prohibits setting of the boundary.

In a boundary detection device such as this, when numerous reflections are present in the captured image, notification that the reliability of the captured image is low can be recorded.

The low reliability flag setting means may be that, when the number or percentage of the boundary candidates of which the formed angle is less than the angle reference value is the extraction judgment reference number set in advance or more, set a flag indicating that the reliability of the captured image is low in association with the captured image (without prohibiting the setting of the boundary of the driving lane by the CPU using the captured image). In this configuration, whether or not the information on the end section of the driving area obtained in the present configuration is used can be determined based on the flag by a device receiving the information.

Furthermore, in the above-described boundary detection device, as according to another aspect, a wetness outputting means may be included for outputting notification that the driving area is wet when the number or percentage of boundary candidates of which the formed angle is less than the angle reference value is a wetness reference value set in advance or more.

In a boundary detection device such as this, when a certain amount of reflections is detected in the captured image (wetness reference value or more), notification that the driving area is wet can be outputted. Therefore, another device that has received the output can judge whether or not to use the information regarding the end section of the driving area obtained by the present configuration, based on the output. Whether the extraction judgment reference value is higher or lower than, the wetness reference value is irrelevant. The extraction judgment reference value and the wetness reference value can each be set to an arbitrary value.

In the above-described boundary detection device, a correcting means may be included for acquiring a direction of the vertical line in the captured image and a vertical direction of the vehicle and correcting the direction of the vertical line in the captured image such that the directions match.

In a boundary detection device such as this, even when the vertical direction in the captured image is misaligned with the vertical direction of the vehicle, the misalignment can be corrected. Therefore, the accuracy of detection of the boundary of the road area can be improved.

The correcting means may, for example, correct tilting during installation of an imaging means (camera) for performing imaging and a roll angle (tilting in the left and right directions) when the vehicle is traveling.

DETAILED DESCRIPTION OF THE PREFERRED EMBODIMENTS

An embodiment of the present invention will hereinafter be described with reference to the drawings.

Figure 1A:
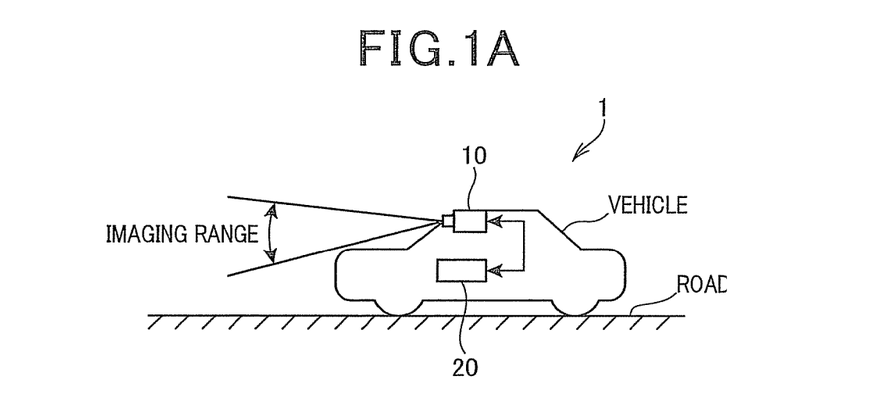
FIG. 1A and FIG. 1B are block diagrams of a configuration of a boundary detection system mounted in a vehicle.
Figure 1B:
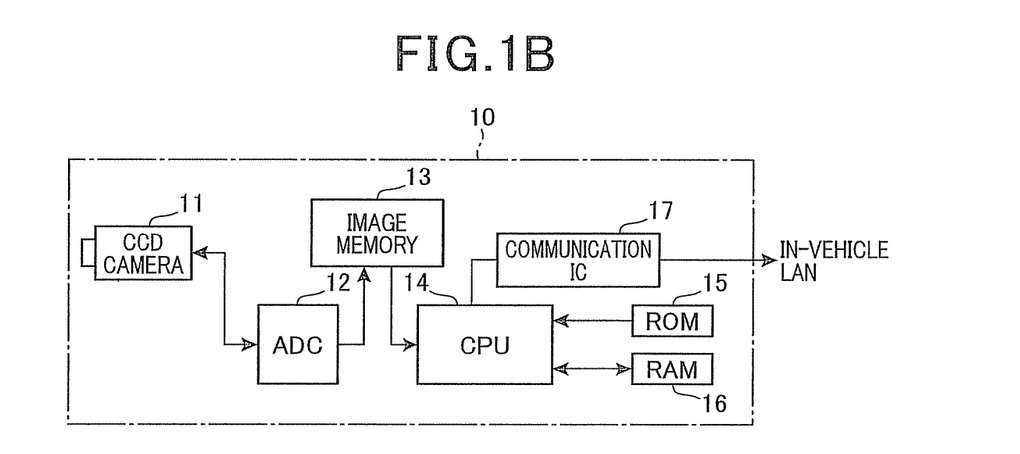

FIG. 1A and FIG. 1B are block diagrams of a configuration of a boundary detection system 1 that is mounted in a vehicle. FIG. 1A shows an overall configuration. FIG. 1B shows a detailed configuration of a lane boundary detection device that is a main section. As shown in FIG. 1A, the boundary detection system 1 includes a lane boundary detection device 10 (boundary detection device) and a vehicle-control electronic control unit (ECU) 20.

The lane boundary detection device 10 provides a function for generating boundary parameters indicating a position serving as a boundary (referred to, hereinafter, as a "lane boundary") of a lane (driving area) in which the own vehicle is traveling. The vehicle-control ECU 20 is connected to the lane boundary detection device 10 by an in-vehicle local area network (LAN). The vehicle-control ECU 20 provides a function for performing various processes to determine the probability (or possibility) of the own vehicle deviating from the lane in which the vehicle is traveling and notifying the driver of this deviation, based on the boundary parameters acquired from the lane boundary detection device 10 via the in-vehicle LAN.

As shown in FIG. 1B, the lane boundary detection device 10 includes a charge-coupled device (CCD) camera 11, an analog-to-digital converter (ADC) 12, an image memory 13, a central processing unit (CPU) 14, a read-only memory (ROM) 15, a random access memory (RAM) 16, and a communication integrated circuit (IC) 17. The CCD camera 11 is disposed such as to capture the road surface in the direction in which the vehicle is traveling (ahead of the vehicle).

The ADC 12 converts the analog image signals outputted from the CCD camera 11 to digital image data. The image memory 13 stores therein the image data acquired from the ADC 12.

The CPU 14 performs, for example, a process for generating the boundary parameters based on the image data stored in the image memory 13. The ROM 15 stores therein programs for the processes performed by the CPU 14 and the like. The RAM 16 functions as a working area of the CPU 14.

The communication IC 17 outputs processing results from the CPU 14 and the like to an external destination via the in-vehicle LAN.

In a manner similar to the lane boundary detection device 10, the vehicle-control ECU 20 includes a CPU, a ROM, a RAM, and a communication IC. In addition, the vehicle-control ECU 20 includes, for example, an input/output (IO) support for receiving a detection signal from a sensor directly connected to the ECU 20 and the like, and outputting a control signal to a component to be controlled.

Here, at least a speaker that generates a warning sound is connected as a component to be controlled. The vehicle-control ECU 20 may also be configured to function as a device for preventing traffic accidents, such as a steering torque control device that controls steering torque such that the vehicle does not deviate from the driving lane.

Figure 2A:
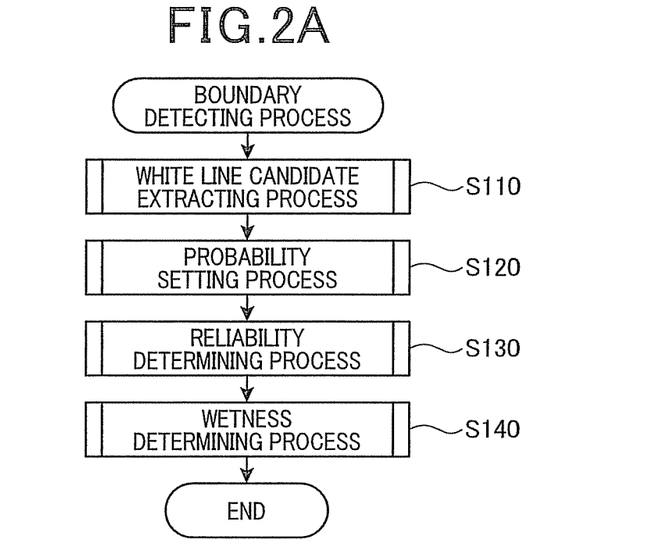
FIG. 2A is a flowchart of a boundary detecting process.

Next, a boundary detecting process performed by the CPU 14 (details of a process performed through the boundary detection program) will be described with reference to the flowcharts shown in FIG. 2 and subsequent drawings. The boundary detecting process is started when, for example, power of the vehicle, such as an ignition switch, is turned ON. The boundary detecting process is then repeatedly performed at a fixed interval (such as every 100 ms).

As shown in FIG. 2A, in the boundary detecting process, the CPU 14 sequentially performs a white line candidate extracting process (S110), a probability (or certainty) setting process (S120), a reliability determining process (S130), and a wetness determining process (S140). The boundary detecting process is completed when these processes are completed.

Figure 2B:
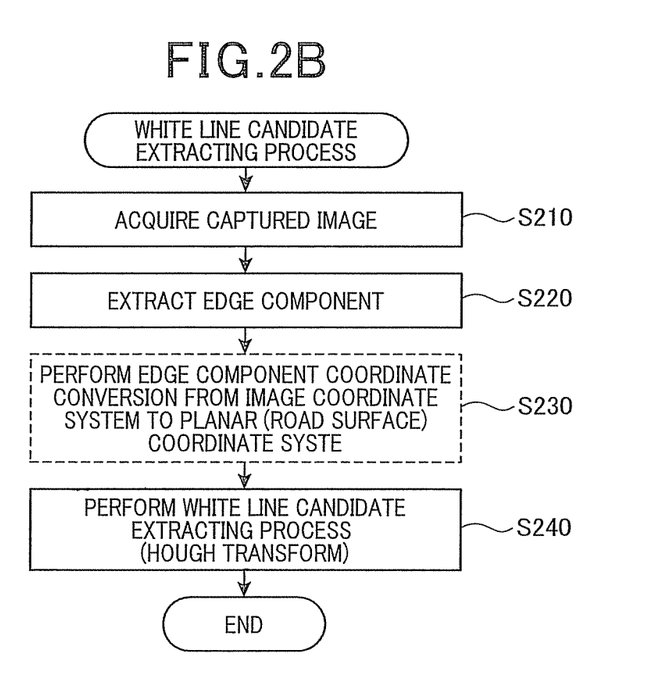
FIG. 2B is a flowchart of a white line candidate extracting process.

The white line candidate extracting process is a process by which a white line candidate (a boundary candidate that may possibly be a boundary of the driving area) is extracted from a captured image. Specifically, as shown in FIG. 2B, first, the CPU 14 acquires an image captured by the CCD camera 11 from the CCD camera 11 (Step 210). The CPU 14 then detects the edge components included in the captured image (S220: edge extracting means).

The edge component indicates an area in which change in luminance that is a luminance reference value or more occurs between adjacent pixels, among the numerous pixels configuring the captured image. The edge component is also commonly referred to as an edge point. The process for detecting the edge component is known. Therefore, explanation thereof is omitted.

Next, the CPU 14 extracts candidates for a curve (including straight lines) to be the boundary of the driving area as boundary candidates based on the placement of each edge component, by performing the known Hough transform technique (S240: boundary candidate extracting means). When a process such as this is completed, the white line candidate extracting process is completed.

Figure 3:
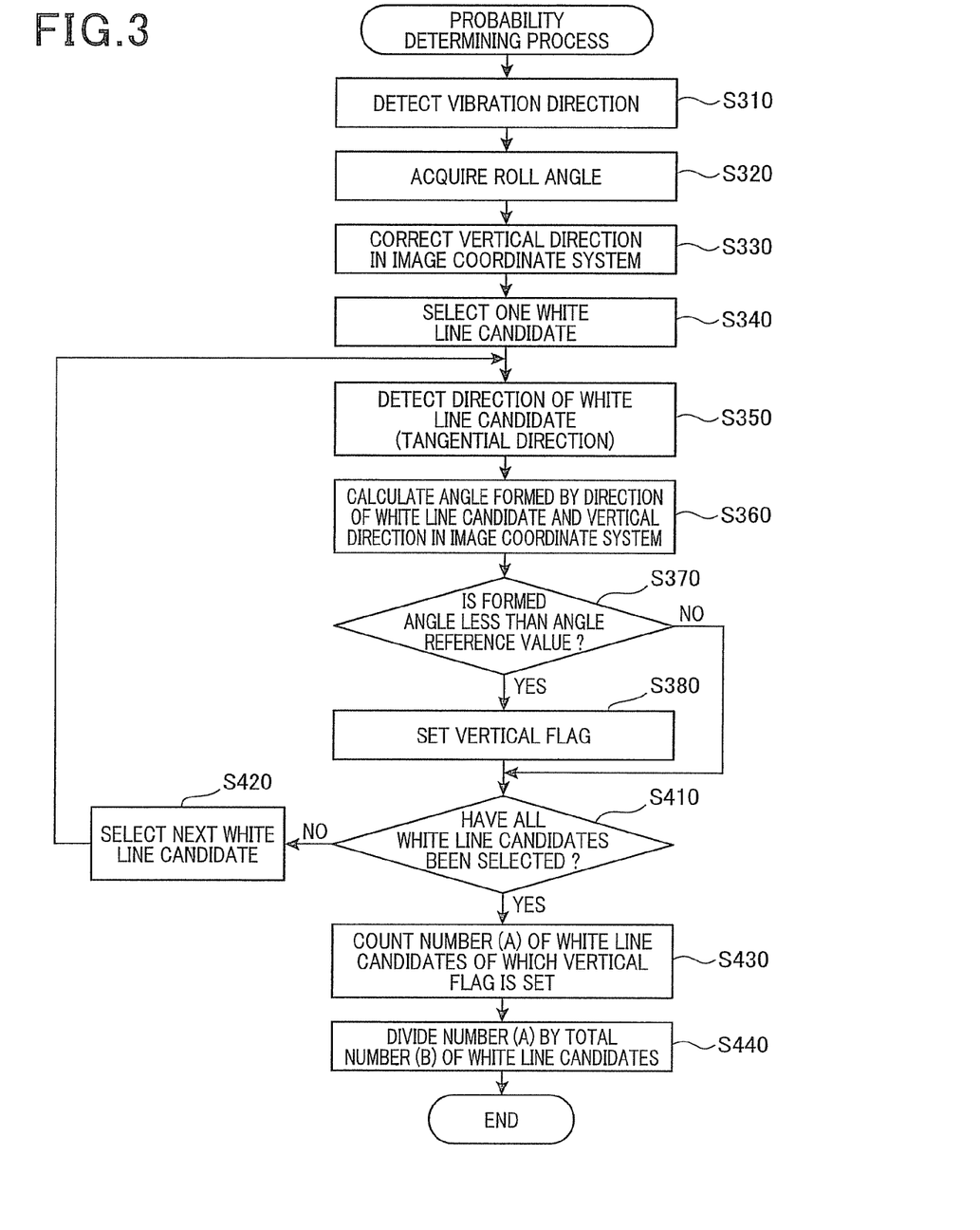
FIG. 3 is a flowchart of a probability determining process.

Next, the probability determining process will be described. The probability determining process is a process by which probability of a white line candidate is set based on the direction (tangential direction) of the white line candidate. As shown in FIG. 3, in the probability determining process, first, the CPU 14 detects a vibration direction of the own vehicle (S310: correcting means) and acquires information on a roll angle (tilting in the left and right directions) of the own vehicle (S320: correcting means).

Here, the vibration direction of the own vehicle can be determined by a certain object (a stationary object such as a building) within the captured image being monitored over a plurality of frames and the direction in which the object sways being identified. Specifically, the vibration direction when the vehicle is traveling straight ahead (identifiable by the yaw rate or the like) is detected. The detected vibration direction is then compared with the vertical direction of the captured image, thereby enabling detection of tilting during installation of the CCD camera 11. In addition, the roll angle of the own vehicle can be determined, for example, based on information from a plurality of vehicle height sensors (not shown) that measure vehicle height near each wheel.

Next, the direction of a vertical line in the captured image is corrected such that the vertical direction in the captured image matches the vertical direction in the vehicle (the vibration direction when the vehicle is traveling straight ahead) (S330: correcting means). In this process, the direction of the vertical line in the captured image is corrected by an amount equivalent to a sum of the tilting during installation of the CCD camera 11 and the roll angle.

Then, the CPU 14 selects one of the extracted white line candidates (S340). Next, the CPU 14 detects the direction in which the edge components configuring the white line candidate is aligned (the direction of the white line candidate) (S350). In this process, when a straight line is extracted as the white line candidate, the direction of the straight line is detected. When a curved line is extracted as the white line candidate, the direction of a tangent in a predetermined section (such as a section equivalent to 10 m ahead) is detected.

Next, the CPU 14 calculates an angle formed by the direction of the white line candidate and the direction of the vertical line in the captured image in an image coordinate system (S360). The CPU 14 then compares the formed angle with an angle reference value set in advance (S370). A curve that is to be the boundary of the driving area often extends in a direction at an angle by a certain extent from the vertical direction, whereas a curve that is to be an object reflected on the road surface often extends in a direction almost matching the vertical direction. Focusing on this characteristic, here, the angle reference value is set to a value that is, for example, about 10° to eliminate curves that are to be objects reflected on the road surface.

Figure 4A:
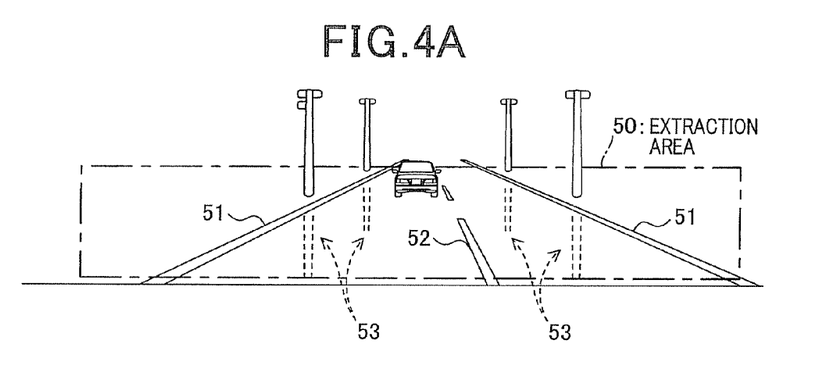
FIG. 4A to FIG. 4C are explanatory diagrams of a process for extracting white line candidates from a captured image.
Figure 4B:
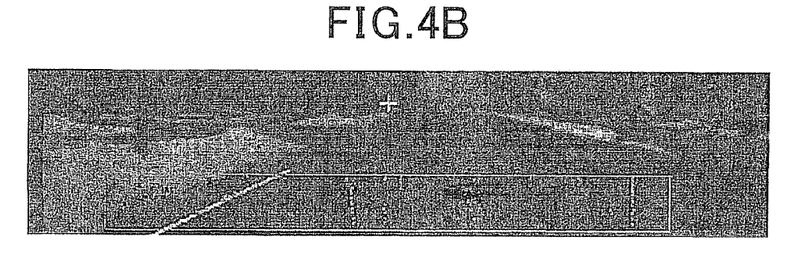
Figure 4C:
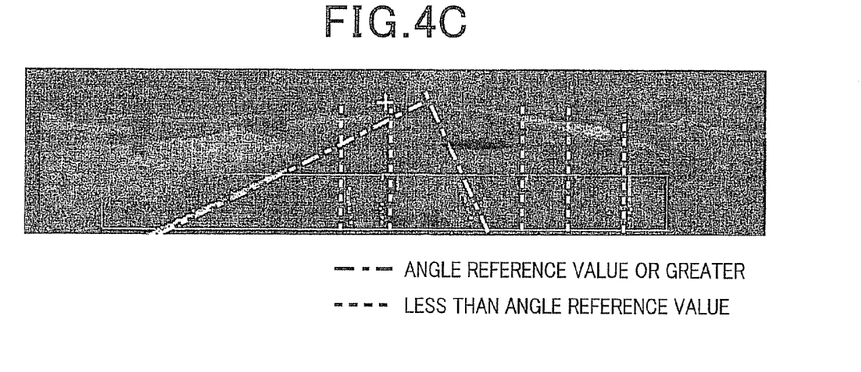

A specific example of the processes performed at S350 to S370 is explained with reference to FIG. 4A to FIG. 4C. FIG. 4A to FIG. 4C are explanatory diagrams of the process for extracting the white line candidates from the captured image. FIG. 4A is a schematic diagram of the captured image. FIG. 4B shows the actual captured image. FIG. 4C is an explanatory diagram of whether or not a boundary candidate is eliminated.

The image captured by the CCD camera 11 is, for example, as shown in FIG. 4A. An area of the captured image in which a road is expected to be captured is set as an extraction area 50 in which extraction of the white line candidates is performed. In the extraction area 50, as white lines, side lines 51 and a center line 52 are included, as well as unnecessary objects 53 that are utility poles and buildings reflected in the road depending on the weather.

When the edge components in the extraction area 50 are extracted, edge components are acquired as indicated by each point in FIG. 4B. When the directions of the edge components (in the instance of a curved line, the tangential direction at pixels corresponding to a predetermined distance (set to an experimentally optimal distance) from the road) are detected, a plurality of straight lines indicated by broken lines and dash-dot lines as shown in FIG. 4C are acquired.

The angles formed by the straight lines and the direction of the vertical line in the captured image are calculated. The formed angles are compared with the angle reference value. In the example in FIG. 4C, only the formed angles of the side lines 51 and the center line 52 are the angle reference value or greater (dash-dot lines). The formed angles of all unnecessary objects 53 are less than the angle reference value (broken lines).

Returning to FIG. 3, when judged that the angle formed by the direction of the white line candidate and the direction of the vertical line in the captured image is the angle reference value or greater (NO at S370), the CPU 14 immediately proceeds to S410, described hereafter. When judged that the angle formed by the direction of the white line candidate and the direction of the vertical line in the captured image is less than the angle reference value (YES at S370), the CPU 14 sets a vertical flag indicating indicates that the direction of the white line candidate is near the direction of the vertical line in the captured image (S380; probability setting means). The white line candidate of which the vertical flag has been set is considered to have low probability as the boundary of the driving area.

Next, whether or not all white line candidates have been selected is judged (S410). When judged that none the white line candidates have been selected (NO at S410), the CPU 14 selects one of the unselected white line candidates (S420) and returns to the process at S350.

When judged that all white line candidates have been selected (YES at S410), the CPU 14 determines a value (A) that is a count of the number of white line candidates of which the vertical flag has been set (S430). The CPU 14 then calculates a value (B) that is the counted value (A) divided by the total number of white line candidates (S440). When a process such as this is completed, the probability determining process is completed.

Figure 5:
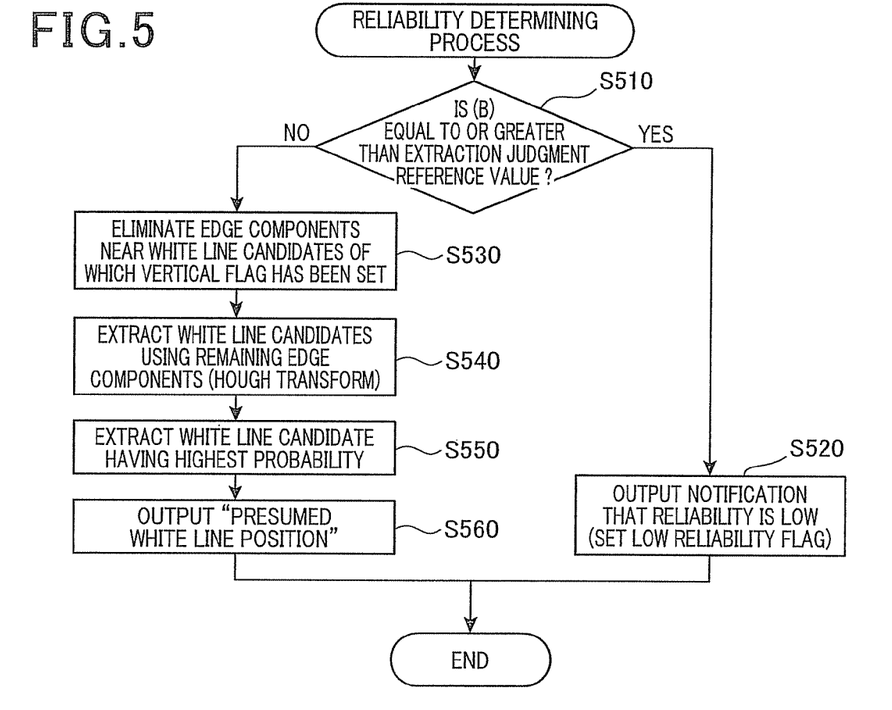
FIG. 5 is a flowchart of a reliability determining process.

Next, the reliability determining process is explained. The reliability determining process is a process by which reliability of the captured image on which extraction of the edge components has been performed is determined. As shown in FIG. 5, in the reliability determining process, first, the CPU 14 compares the value (B) calculated at S440 with an extraction judgment reference value (S510: extraction prohibiting means).

Here, the extraction judgment reference value is a value for judging reliability of the captured image when the boundary of the road area is detected based on a percentage (may also be an absolute number) of the number of white line candidates of which the vertical flag has been set in relation to the total number of white line candidates. For example, when the percentage of the white line candidates of which the vertical flag has been set exceeds 80 percent, the reliability of the captured image is judged to be low.

When judged that the value (B) calculated at S440 is the extraction judgment reference value or higher (YES at S510), the CPU 14 sets a flag indicating low reliability and outputs notification thereof (S520: low reliability flag setting means). The reliability determining process is completed. When judged that the value (B) calculated at S440 is lower than the extraction judgment reference value (NO at S510), reliability is considered sufficiently high. The CPU 14 eliminates the edge components near the white line candidates of which the vertical flag has been set (S530: probability setting means).

In this process, for example, the edge components positioned within a range of about several pixels from the pixels through which the white line candidate passes may be eliminated (or ignored in subsequent processes). Next, the CPU 14 performs the Hough transform again on the edge components that have not been removed, thereby extracting the white line candidates (S540). The CPU 14 then extracts the white line candidate having the highest probability acquired by through the Hough transform (S550: boundary setting means).

A white line candidate having the highest probability may be extracted from each area on the left and the right, with reference to the center of the captured image. Next, the CPU 14 sets the extracted white line candidate as a "presumed white line position (road area boundary)" and outputs information including the presumed white line position as the boundary parameters (S560). The reliability determining process is completed.

Figure 6:
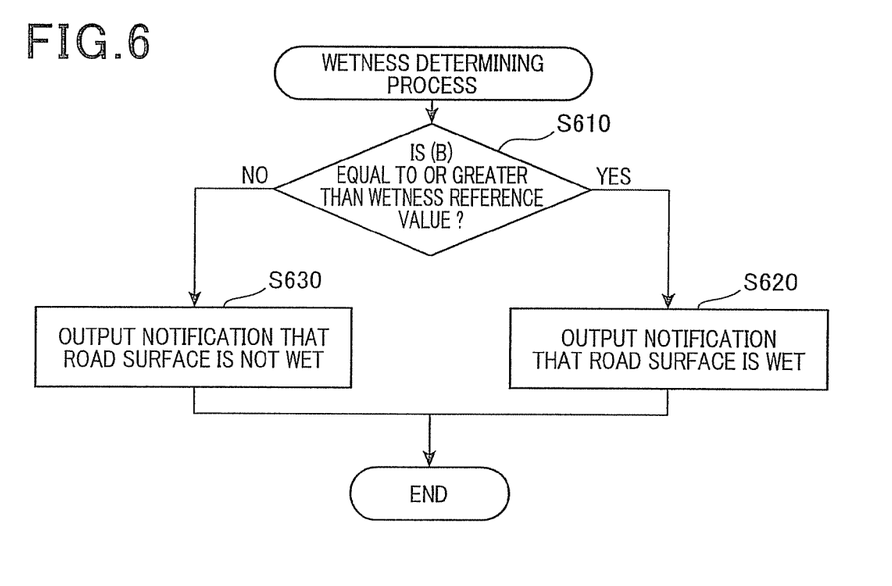
FIG. 6 is a flowchart of a wetness determining process.

Next, the wetness determining process will be described. The wetness determining process is a process by which judgment is made regarding whether or not a road surface is wet.

As shown in FIG. 6, in the wetness determining process, first, the CPU 14 compares the value (B) calculated at S440 with a wetness reference value (S610: wetness outputting means). Here, the wetness reference value is a value for determining whether or not the road surface is wet based on whether or not a reflection is present in the captured image. The wetness reference value is, for example, set to about 50 percent.

When judged that the value (B) calculated at S440 is the wetness reference value or higher (YES at S610), the CPU 14 outputs notification that the road surface is wet (S620: wetness outputting means). The wetness determining process is completed. When judged that the value (B) calculated at S440 is less than the wetness reference value (NO at S610), the CPU 14 outputs notification that the road surface is not wet (S630). The wetness determining process is completed.

In the lane boundary detection device 10 of the boundary detection system 1 described in detail above, the CPU 14 extracts a plurality of edge components from the captured image capturing the periphery of the own vehicle. The CPU 14 extracts candidates of a curve (including straight lines) that is to be the boundary of the driving area as boundary candidates based on the placement of the plurality of edge components. Then, the CPI 14 calculates the angle formed by a tangent in a predetermined section of each extracted boundary candidate and the vertical line in the captured image. Boundary candidates of which the formed angle is less than the angle reference value are set to have lower probability. The boundary candidate having the highest probability among the boundary candidates is set as the boundary of the driving area.

In other words, in the lane boundary detection device 10 of the present invention, in the captured image, a curve that is to be the boundary of the driving area often extends in a direction at an angle by a certain extent from the vertical direction, whereas a curve that is to be an object reflected on the road surface often extends in a direction almost matching the vertical direction. Focusing on this characteristic, a boundary candidate of which the angle formed by the curve serving as the boundary candidate and the vertical line in the captured image is less than the angle reference value is set to have a lower probability. The boundary candidate is thereby detected.

In the lane boundary detection device 10 such as this, the curve that should be the boundary of the driving area has a relatively high probability and can be easily set as the boundary of the driving area. Therefore, even when a reflection is present on the road surface in the captured image, the boundary of the driving lane can be accurately detected.

In addition, the CPU 14 of the lane boundary detection device 10 eliminates, from the boundary candidates, the boundary candidates that are less than an elimination reference value in which above-described formed angle is set to a value that is the angle reference value or less. In other words, the CPU 14 sets the probability of these boundary candidates to zero.

In the lane boundary detection device 10 such as this, the boundary candidates that are less than the elimination reference value are determined to be reflected objects and are eliminated. Therefore, the accuracy of detection of the boundary of the driving lane can be improved.

In addition, the CPU 14 of the lane boundary detection device 10 detects new boundary candidates by performing the Hough transform on each edge component configuring the boundary candidates that have not been eliminated. The CPU 14 then selects the boundary candidate having the highest probability among the new boundary candidates.

In the lane boundary detection device 10 such as this, the Hough transform is performed on each edge component configuring the boundary candidates that have not been eliminated and new boundary candidates are detected. Therefore, the boundary of the driving area can be detected using accurate boundary candidates. According to the present embodiment, the CPU 14 performs the Hough transform twice.

Furthermore, in the lane boundary detection device 10, when the number or percentage of boundary candidates of which the above-described formed angle is less than the angle reference value is the extraction judgment reference value set in advance or more, the CPU 14 prohibits setting of the boundary of the driving lane using the captured image.

In the driving lane boundary detection device 10 such as this, when the number or percentage of the boundary candidates of which the formed angle is less than the angle reference value is the extraction judgment reference value or more, or in other words, when numerous reflections are present in the captured image, the reliability of the captured image itself is considered low. Use of the captured image can be prohibited. In this instance, for example, the boundary of the driving lane can be detected by a method that does not use the captured image (such as a method using laser radar).

In addition, in the lane boundary detection device 10, the CPU 14 sets a flag indicating that the reliability of the captured image is low when prohibiting the setting of the boundary. In the lane boundary detection device 10 such as this, when numerous reflections are present in the captured image, notification that the reliability of the captured image is low can be recorded.

Furthermore, in the lane boundary detection device 10, when the number or percentage of the boundary candidates of which the formed angle is the angle reference value or less is the wetness reference value set in advance or more, the CPU 14 outputs notification that the driving area is wet.

In the lane boundary detection device 10 such as this, when a certain amount of reflections is detected in the captured image (wetness reference value or more), notification that the driving area is wet can be outputted. Therefore, another device that has received the output can judge whether or not to use the information regarding the end section of the driving area obtained by the present configuration, based on the output. Whether the extraction judgment reference value is higher or lower than the wetness reference value is irrelevant. The extraction judgment reference value and the wetness reference value can each be set to an arbitrary value.

The CPU 14 in the lane boundary detection device 10 acquires both the direction of the vertical line in the captured image and the vertical direction of the vehicle. The CPU 14 then corrects the direction of the vertical line in the captured image such that the two directions match.

In the lane boundary detection device 10 such as this, even when the vertical direction in the captured image is misaligned with the vertical direction of the vehicle, the misalignment can be corrected. Therefore, the accuracy of detection of the boundary of the road area can be improved.

Other Embodiments

The embodiments of the present invention are not limited to that described above. Various embodiments are possible without departing from the technical scope of the present invention.

For example, according to the above-described embodiment, the angle reference value used in the process at S370 and the extraction judgment reference value (elimination reference value) used in the process at S510 may be the same value or different values.

The CPU 14 of the present invention may perform such that, when the number or percentage of the boundary candidates of which the formed angle is less than the angle reference value is the extraction judgment reference number set in advance or more, set a flag indicating that the reliability of the captured image is low (without prohibiting the setting of the boundary of the driving lane by the CPU 14 using the captured image). In this configuration, whether or not the information on the end section of the driving area obtained in the present configuration is used can be determined based on the flag by a device receiving the information.

Between the process at S220 and the process at S240, a process may be performed to convert the image coordinate system to a planar (road surface) coordinate system (S230). As a result, processing by other applications that perform processing in the planar coordinate system (such as an application that judges whether or not a collision will occur) can be facilitated. When the coordinate system is converted as described above, in the process at S360, the value in the planar coordinate system can be converted into a value in the image coordinate system and the angle (formed angle) can be calculated.

In addition, in the process at S530, the probability of the relevant edge components can be set low, rather than eliminating the edge components. For example, the probability of these edge components can be set to half of that of other edge components. The Hough transform can then be performed in the process at S540, taking into consideration the set probability. In this instance, when a new white line candidate is extracted, the positions of the edge components having low probability are unlikely to be considered. Therefore, in a manner similar to that according to the present embodiment, the accuracy of detection of the boundary of the road area can be improved.

Furthermore, the invention according to the present embodiment can be used in combination with other processes for detecting the boundary of the road area and paint, such as a crosswalk on the road surface. In this instance, for example, a method in which positions of the boundary, paint, and the like obtained in each process are multiplied by a predetermined coefficient and added can be used, thereby improving reliability of boundary detection. In addition, in this instance, the coefficient multiplied to the positions of the boundaries obtained in the above-described process can be changed depending on whether or not the low reliability flag is set according to the above-described embodiment.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A boundary detection device that is mounted in a vehicle and detects a boundary of a driving area in which an own vehicle is traveling, the boundary detection device comprising:
   an edge extracting means for extracting a plurality of edge components from a captured image capturing the periphery of the own vehicle;
   a boundary candidate extracting means for extracting candidates of a curve, including straight lines, that is to be the boundary of the driving area as boundary candidates based on placement of the plurality of edge components;
   a probability setting means for calculating an angle formed by a tangent in a predetermined section of each extracted boundary candidate and a vertical line in the captured image, and setting a boundary candidate of which the formed angle is less than an angle reference value to have a low probability; and
   a boundary setting means for setting a boundary candidate having the highest probability among the boundary candidates as the boundary of the driving area.

2. The boundary detection device according to claim 1, wherein the probability setting means eliminates, from the boundary candidates, a boundary candidate that is less than an elimination reference value in which the formed angle is set to a value that is the angle reference value or less.

3. The boundary detection device according to claim 2, wherein the boundary setting means performs the Hough transform on each component configuring boundary candidates that have not been eliminated, thereby detecting new boundary candidates, and selecting a boundary candidate having the highest probability among the new boundary candidates.

4. The boundary detection device according to claim 3, comprising:
an extraction prohibiting means for prohibiting setting of the boundary of the driving area by the boundary setting means using the captured image, when the number or percentage of boundary candidates of which the formed angle is less than the angle reference value is an extraction judgment reference value set in advance or more.

5. The boundary detection device according to claim 4 comprising:
a low reliability flag setting means for setting a flag indicating that reliability of the captured image is low in association with the captured image when the extraction prohibiting means prohibits setting of the boundary.

6. The boundary detection device according to claim 5 comprising:
a wetness outputting means for outputting notification that the driving area is wet when the number or percentage of boundary candidates of which the formed angle is less than the angle reference value is a wetness reference value set in advance or more.

7. The boundary detection device according to claim 6 comprising:
a correcting means for acquiring a direction of the vertical line in the captured image and a vertical direction of the vehicle and correcting the direction of the vertical line in the captured image such that the directions match.

8. The boundary detection device according to claim 2, comprising:
an extraction prohibiting means for prohibiting setting of the boundary of the driving area by the boundary setting means using the captured image, when the number or percentage of boundary candidates of which the formed angle is less than the angle reference value is an extraction judgment reference value set in advance or more.

9. The boundary detection device according to claim 8 comprising:
a low reliability flag setting means for setting a flag indicating that reliability of the captured image is low in association with the captured image when the extraction prohibiting means prohibits setting of the boundary.

10. The boundary detection device according to claim 9 comprising:
a wetness outputting means for outputting notification that the driving area is wet when the number or percentage of boundary candidates of which the formed angle is less than the angle reference value is a wetness reference value set in advance or more.

11. The boundary detection device according to claim 10 comprising:
a correcting means for acquiring a direction of the vertical line in the captured image and a vertical direction of the vehicle and correcting the direction of the vertical line in the captured image such that the directions match.

12. The boundary detection device according to claim 1, comprising:
an extraction prohibiting means for prohibiting setting of the boundary of the driving area by the boundary setting means using the captured image, when the number or percentage of boundary candidates of which the formed angle is less than the angle reference value is an extraction judgment reference value set in advance or more.

13. The boundary detection device according to claim 12 comprising:
a low reliability flag setting means for setting a flag indicating that reliability of the captured image is low in association with the captured image when the extraction prohibiting means prohibits setting of the boundary.

14. The boundary detection device according to claim 13 comprising:
a wetness outputting means for outputting notification that the driving area is wet when the number or percentage of boundary candidates of which the formed angle is less than the angle reference value is a wetness reference value set in advance or more.

15. The boundary detection device according to claim 14 comprising:
a correcting means for acquiring a direction of the vertical line in the captured image and a vertical direction of the vehicle and correcting the direction of the vertical line in the captured image such that the directions match.

16. The boundary detection device according to claim 1 comprising:
a wetness outputting means for outputting notification that the driving area is wet when the number or percentage of boundary candidates of which the formed angle is less than the angle reference value is a wetness reference value set in advance or more.

17. The boundary detection device according to claim 1 comprising:
a correcting means for acquiring a direction of the vertical line in the captured image and a vertical direction of the vehicle and correcting the direction of the vertical line in the captured image such that the directions match.

18. A boundary detection program residing on a non-transitory storage medium that enables a computer to function as each means configuring a boundary detection device that is mounted in a vehicle and detects a boundary of a driving area in which an own vehicle is traveling, wherein the boundary detection device comprising: an edge extracting means for extracting a plurality of edge components from a captured image capturing the periphery of the own vehicle; a boundary candidate extracting means for extracting candidates of a curve, including straight lines, that is to be the boundary of the driving area as boundary candidates based on placement of the plurality of edge components; a probability setting means for calculating an angle formed by a tangent in a predetermined section of each extracted boundary candidate and a vertical line in the captured image, and setting a boundary candidate of which the formed angle is less than an angle reference value to have a low probability; and a boundary setting means for setting a boundary candidate having the highest probability among the boundary candidates as the boundary of the driving area.

* * * * *